US010371863B2

(12) United States Patent
Leeds et al.

(10) Patent No.: US 10,371,863 B2
(45) Date of Patent: *Aug. 6, 2019

(54) ESTIMATING RAINFALL ADJUSTMENT VALUES

(71) Applicant: The Climate Corporation, San Francisco, CA (US)

(72) Inventors: Bill Leeds, San Francisco, CA (US); Valliappa Lakshmanan, Bellevue, WA (US)

(73) Assignee: The Climate Corporation, San Francisco, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 15/097,604

(22) Filed: Apr. 13, 2016

(65) Prior Publication Data

US 2017/0300602 A1 Oct. 19, 2017

(51) Int. Cl.
*G01W 1/14* (2006.01)

(52) U.S. Cl.
CPC ..................... *G01W 1/14* (2013.01)

(58) Field of Classification Search
CPC ........... G01W 1/10; G01W 1/14; G01S 13/95; G06N 7/005; Y02A 90/18; Y02A 90/14; G06F 17/16; G06F 17/18; G06F 17/5009
See application file for complete search history.

(56) References Cited

U.S. PATENT DOCUMENTS

| 8,594,936 B1 * | 11/2013 | Koval | G01W 1/14 702/3 |
| 2013/0222179 A1 | 8/2013 | Jeong | |
| 2014/0278339 A1 * | 9/2014 | Aliferis | G06N 99/005 703/22 |
| 2016/0290918 A1 | 10/2016 | Xu et al. | |
| 2017/0083823 A1 * | 3/2017 | Shen | G06N 7/005 |

(Continued)

OTHER PUBLICATIONS

Spatial regression models for extreme precipitation in Belgium by H. Van de Vyver, 2012, pp. 1-37 (Cited on NPL but annotated with page numbering for art mapping) (Year: 2012).*

(Continued)

*Primary Examiner* — Aniss Chad
*Assistant Examiner* — Bernard E Cothran
(74) *Attorney, Agent, or Firm* — Hickman Palermo Becker Bingham LLP; Sanjeev S. Bajwa

(57) ABSTRACT

A method for estimating adjusted rainfall values for a set of geo-locations using agricultural data comprises using a server computer system that receives, via a network, agricultural data records that are used to estimate rainfall values for the set of geo-locations. Within the server computer system, rainfall calculation instructions receive digital data including observed radar and rain-gauge agricultural data records. The computer system then aggregates the agricultural data records and creates and stores the agricultural data sets. The agricultural data records are then transformed into one or more distribution sets. The distribution sets are then used to determine regression parameters for a digital rainfall regression model. The digital rainfall regression model then is used to estimate adjusted rainfall values for a new set of geo-locations. The server computer system then generates a digital image that includes the geo-locations and the adjusted rainfall values.

20 Claims, 13 Drawing Sheets

(56) References Cited

U.S. PATENT DOCUMENTS

2017/0161614 A1* 6/2017 Mehta ................ G06N 5/022
2017/0300602 A1* 10/2017 Leeds ............. G06F 17/5009
2017/0351963 A1* 12/2017 Leeds ................ G06N 7/005

OTHER PUBLICATIONS

Germann et al., Ensemble radar precipitation estimation—a new topic on the radar horizon, 2006, ResearchGate, pp. 1-4 (Year: 2006).*
Berenguer et al., A Study of the Error Covariance Matrix of Radar Rainfall Estimates in Stratiform Rain, Dec. 2008, American Meteorological Society, pp. 1085-1101 (Year: 2008).*
Aghakouchak et al., Modeling Radar Rainfall Estimation Uncertainties Random Error Model, Apr. 2010, Journal of Hydrologic Engineering, pp. 265-274 (Year: 2010).*
Lassegues et al. Radar-guided control and interpolation of rain gauge precipitation data over France, 2012, Euro4m, pp. 1-49 (Year: 2012).*
Vyver, H. Van, "Spatial Regression Models for Extreme Precipitation in Belgium", dated Sep. 26, 2012, 37 pages.
Li et al., "Am Improved Statistical Approach to Merge Satellite Rainfall Estimates and Raingauge Data", dated 2010, 14 pages.
International Searching Authority, "Search Report" in application No. PCT/US17/27120, dated Jul. 7, 2017, 11 pages.
Current Claims in application No. PCT/US17/27120, dated Jul. 2017, 7 pages.

* cited by examiner

Fig. 2
(a)
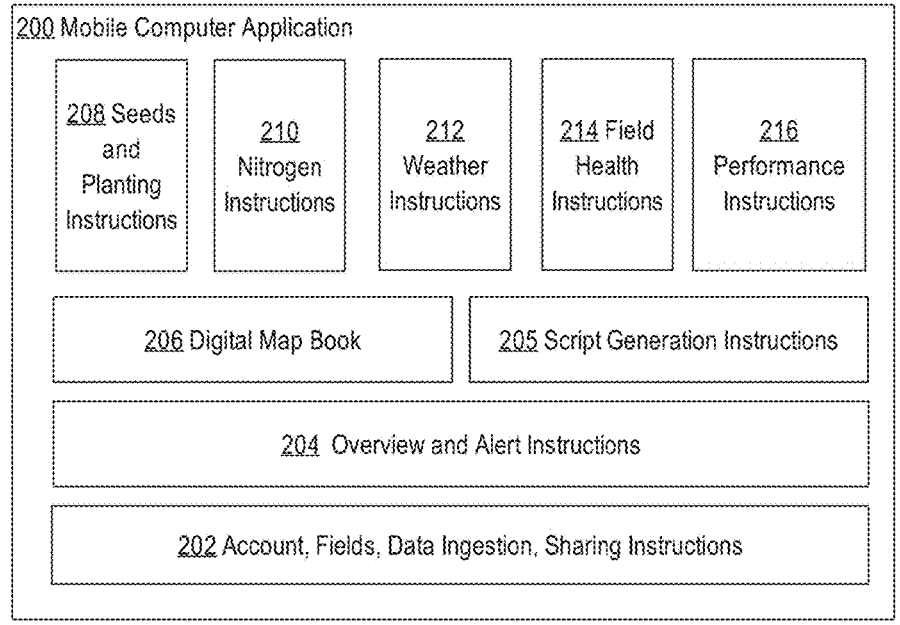
(b)
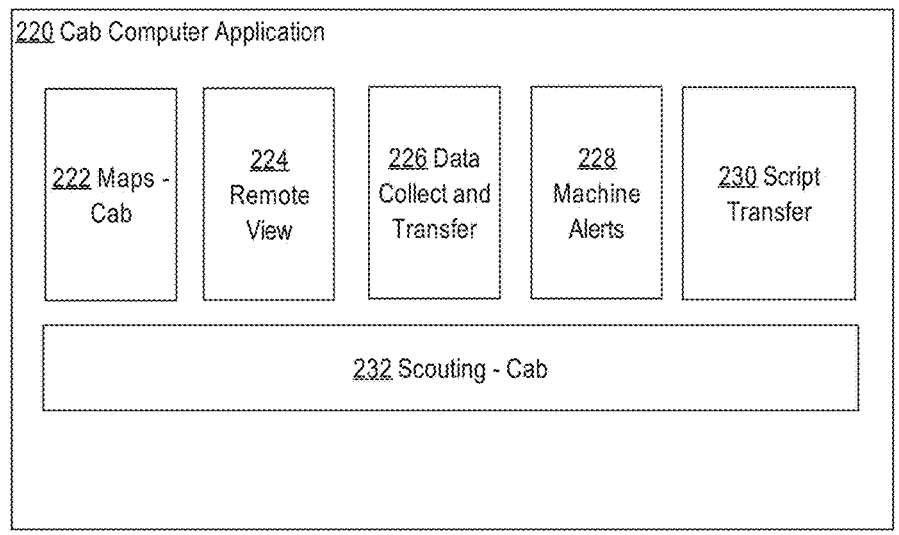

FIG. 6

Data Manager

Nitrogen | Planting | Practices | Soil

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

[+ Add New Planting Plan]

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | --- | DMC82-M | 112 | 160 | 34000 | Apr |
| ☐ Austin, MN 1<br>Corn \| 100 \| Fredricks, MN | Corn | --- | DMC82-M | 114 | 160 | 36000 | Apr |
| ☐ Boone, IN 1<br>Corn \| 100 \| Boone, IA | Corn | --- | DMC82-M | 112 | 150 | 34000 | Apr |
| ☐ Champaign 1<br>Corn \| 100 \| Champaign, IL | Corn | --- | --- | 112 | 200 | 34000 | Apr |
| ☐ E Nebraska 1<br>Corn \| 100 \| Burt, NE | Corn | --- | --- | 112 | 160 | 34000 | Apr |

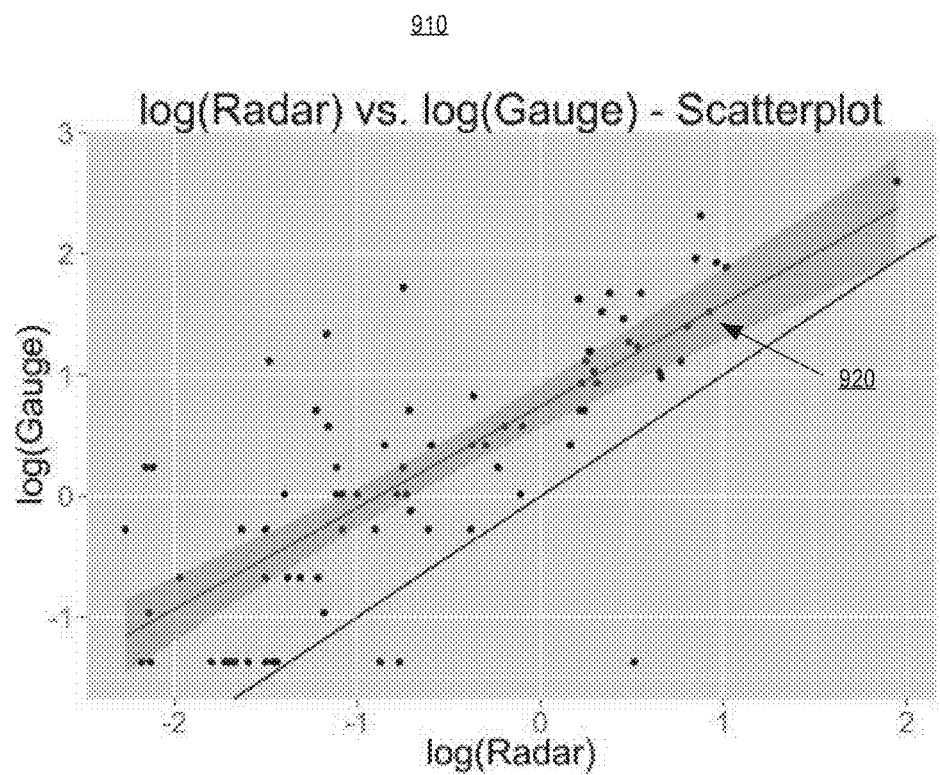

ESTIMATING RAINFALL ADJUSTMENT VALUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2015-2016 The Climate Corporation.

FIELD OF THE DISCLOSURE

The present disclosure relates to predicting rainfall estimates for a set of geo-locations based on observed rainfall estimates.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Rainfall predictions have become an integral part of agricultural planning. Growers commonly make management decisions based on rainfall estimates. Rainfall estimations can be based on different types of rain sensing instruments including weather radars and rain gauges. Weather radars provide wide spatial coverage and average rainfall over a given area. However, radar based estimates may be biased because they depend on certain latent variables, such as rain drop size, and detect water content aloft as opposed to water surface content.

Rain gauges provide more accurate point estimates because they measure actual rain accumulation on the ground. However, rain-gauge data may vary based upon the location of the rain gauge in a field and are localized to the fields where they are installed. Utilization of rain gauge instruments does not provide large spatial coverage to estimate large areas.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 9A and FIG. 9B each depict example scatterplots of rain-gauge data versus radar data.

DETAILED DESCRIPTION

Figure 1:
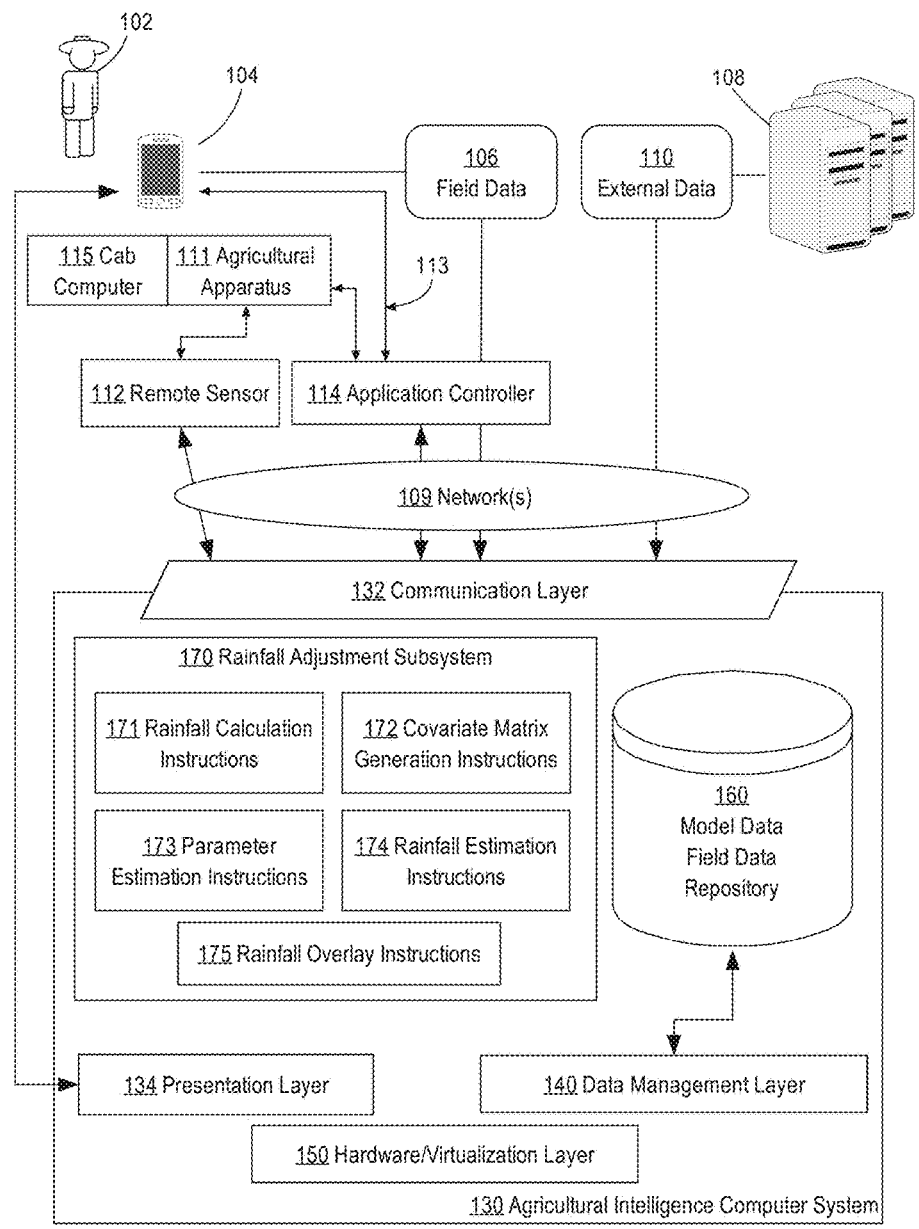
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. RAINFALL ADJUSTMENT SUBSYSTEM
   2.6. IMPLEMENTATION EXAMPLE—HARDWARE OVERVIEW
3. FUNCTIONAL OVERVIEW—ESTIMATING RAINFALL ADJUSTMENT VALUES
   3.1. RECEIVING DATA AND AGGREGATING DATA RECORDS
   3.2. TRANSFORMING DATA RECORDS
   3.3. GENERATING COVARIATE MATRIX
   3.4. GENERATING RAINFALL REGRESSION MODEL
   3.5. ESTIMATING RAINFALL VALUES FOR NEW LOCATIONS
   3.6. PRESENTING RAINFALL VALUES

1. General Overview

A computer system and a computer-implemented method that are configured for estimating adjusted rainfall values for a set of geo-locations using agricultural data is provided. In an embodiment, estimating adjusted rainfall values may be accomplished using a server computer system that is configured and programmed to receive over a digital communication network, electronic digital data representing agricultural data records, including records that represent observed agricultural data points for specific geo-locations at a specific time. Using digitally programmed rainfall calculation instructions, the computer system is programmed to receive digital data including observed radar and rain-gauge agricultural data records. Using the digitally programmed rainfall calculation instructions, the computer system is programmed to aggregate the one or more agricultural data records and store, in computer memory, one or more agricultural data sets, where each agricultural data set represents a single type of observed agricultural data. Using the digitally programmed rainfall calculation instructions, the computer system is programmed to transform the one or more agricultural data sets into one or more agricultural distribution sets, where each agricultural distribution set is a normal distribution.

Using digitally programmed covariate matrix generation instructions, the computer system is programmed to generate and store, in computer memory, a covariate matrix from the one or more agricultural distribution sets. The covariate matrix includes values calculated or derived from the one or more agricultural distribution sets. Using parameter estimation instructions, the computer system is programmed to estimate regression parameters for a digital rainfall regression model. The digital rainfall regression model, stored within computer memory, is generated using values from the covariate matrix as covariates and using one or more agricultural distribution sets as rainfall observations within the digital rainfall regression model.

Using rainfall estimation instructions, the computer system is programmed to estimate adjusted rainfall values for a new set of geo-locations using the stored digital rainfall regression model. Using rainfall overlay instructions, the computer system is programmed to generate a digital image of the set of adjusted rainfall values, where the digital image corresponds to the set of new geo-locations and the adjusted rainfall values are overlaid onto the digital image to graphically represent the adjusted rainfall values.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
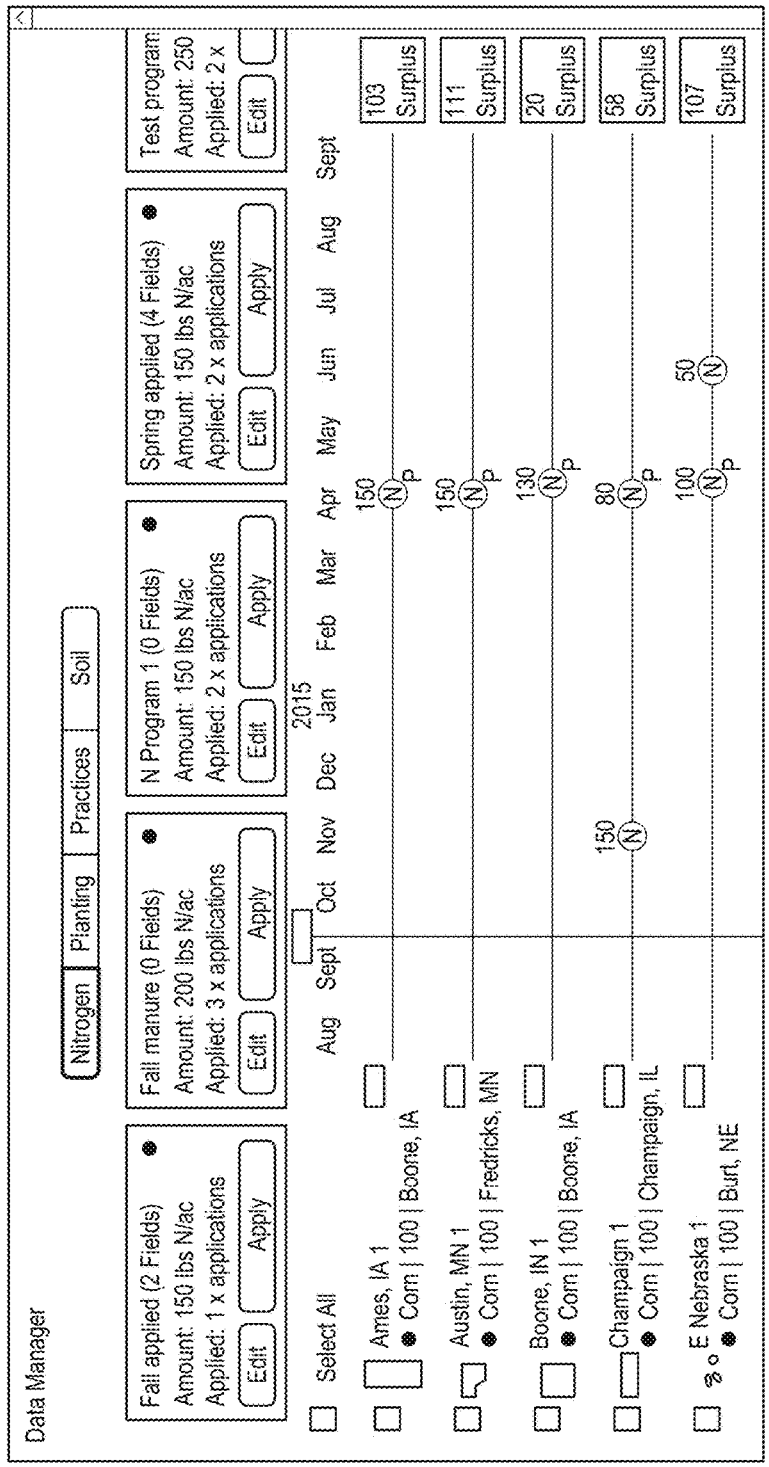
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
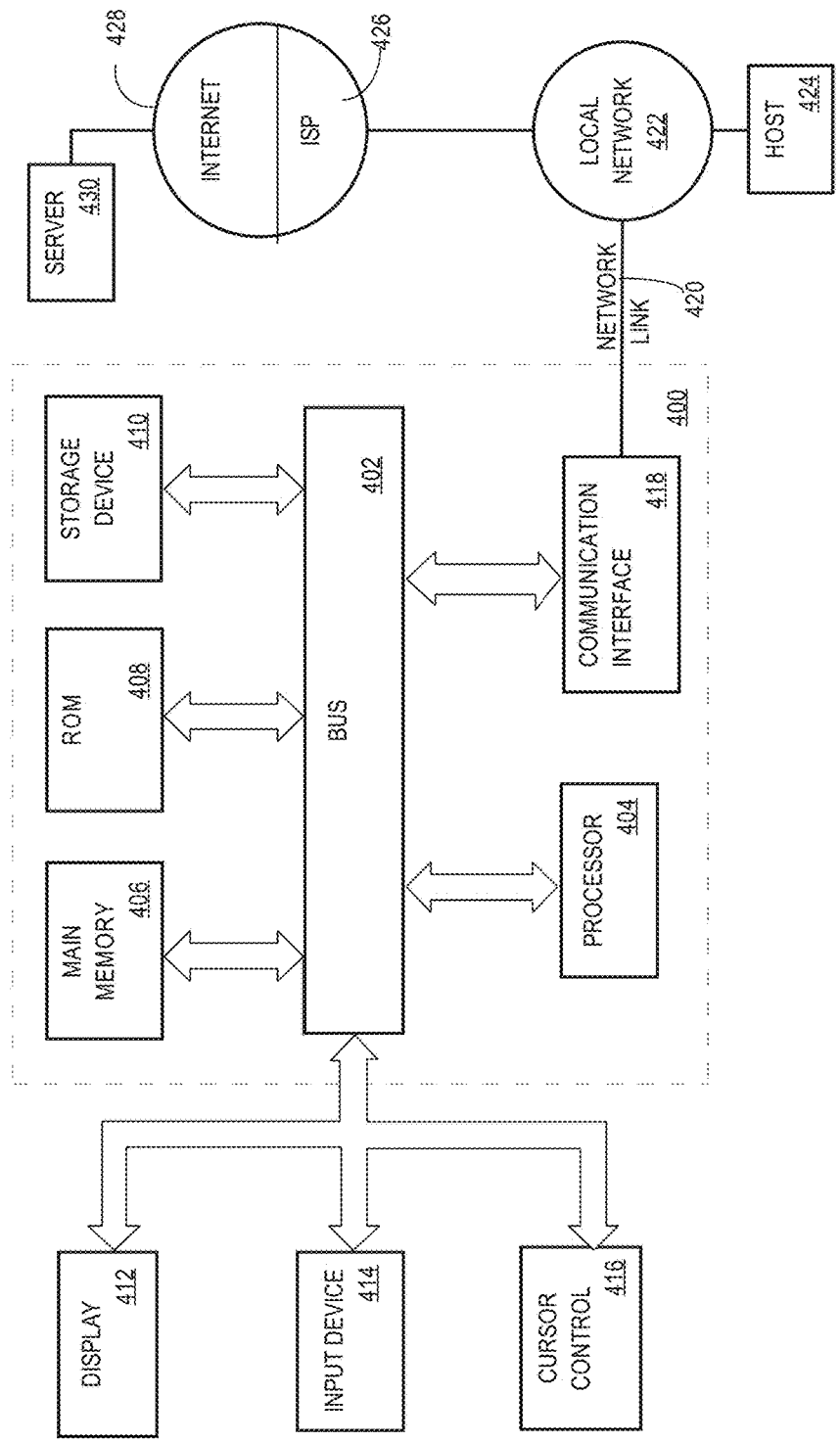
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
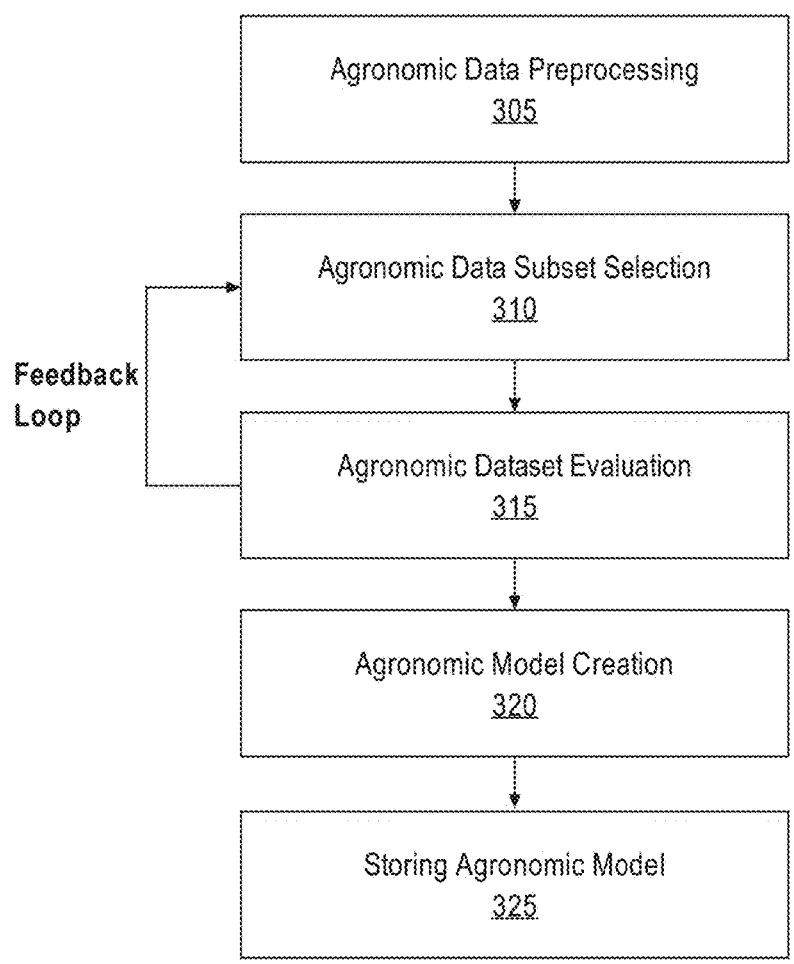
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Rainfall Adjustment Subsystem

In an embodiment, the agricultural intelligence computer system 130, among other components, includes a rainfall adjustment subsystem 170. The rainfall adjustment subsystem 170 is configured to estimate rainfall measurements for new geographic areas by determining adjustment values that are applied to measured rainfall observations. The adjustment values are determined using a rainfall regression model and rainfall regression parameters that are generated using specific observations of geo-locations that include multiple types of rain observations. The agricultural intelligence computer system 130 may use the estimated rainfall measurements to display precipitation models on the field manager computer device 104.

In an embodiment, the rainfall adjustment subsystem 170 contains specially configured logic including, but not limited to, rainfall calculation instructions 171, covariate matrix generation instructions 172, parameter estimation instructions 173, rainfall estimation instructions 174, and rainfall overlay instructions 175. Each of the rainfall calculation instructions 171, covariate matrix generation instructions 172, parameter estimation instructions 173, rainfall estimation instructions 174, and rainfall overlay instructions 175 comprises executable instructions loaded into a set of one or more pages of main memory, such as RAM, in the agricultural intelligence computer system 130 which when executed cause the agricultural intelligence computer system 130 to perform the functions or operations that are described herein with reference to those modules. For example, the rainfall calculation instructions 171 may comprise executable instructions loaded into a set of pages in RAM that contain instructions which when executed cause performing the rainfall calculation functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the rainfall calculation instructions 171, covariate matrix generation instructions 172, parameter estimation instructions 173, rainfall estimation instructions 174, and rainfall overlay instructions 175 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system 130 to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130. The executable instructions in memory, or the stored source code, specified in this paragraph are examples of "modules" as that term is used in this disclosure.

The rainfall calculation instructions 171 provide instructions to perform aggregation of agricultural data records into one or more agricultural data sets, where an agricultural data set represents a set of a single type of observed agricultural data. The rainfall calculation instructions 171 provide further instructions to perform transformation of the one or more agricultural data sets into one or more agricultural distribution sets, where an agricultural distribution set represents a normalized distribution of an agricultural data set. The covariate matrix generation instructions 172 provide instructions to generate covariate matrices, where the covariate matrices are based upon derived values from the one or more agricultural distribution sets. The parameter estimation instructions 173 provide instruction to estimate regression parameters for a rainfall regression model, where the rainfall regression model based upon the one or more agricultural distribution sets. The rainfall regression model and the regression parameters are then used to estimate rainfall adjustment values in new geo-locations. The rainfall estimation instructions 174 provide instructions to estimate rainfall-adjusted values for new geo-locations using the rainfall regression model and one or more agricultural distribution sets from other geo-locations. The rainfall overlay instructions 175 provide instructions to generate a digital image of the estimated rainfall values, accounting for the estimated rainfall adjusted values. The generated digital image may include an image of the new geo-locations and digital representations of the estimated rainfall values overlaid onto the image of the new geo-locations.

2.6 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Overview—Estimating Rainfall Adjustment Values

Figure 7:
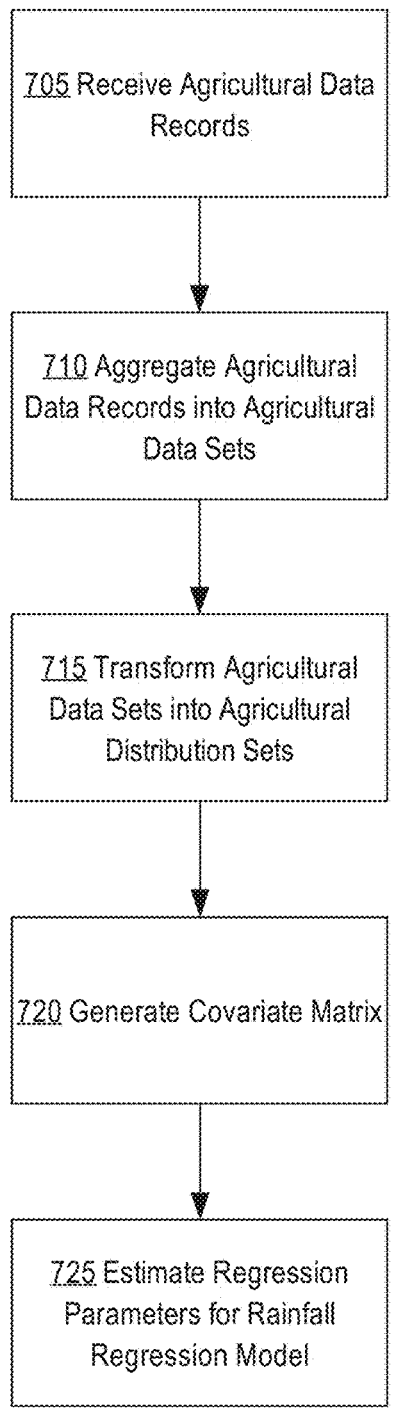
FIG. 7 depicts an example method of estimating regression parameters for a digital rainfall regression model based upon received agricultural data.

FIG. 7 depicts an example method of estimating regression parameters for a rainfall regression model based upon received agricultural data.

3.1. Receiving Data and Aggregating Data Records

At step 705, agricultural data records are received. For example, agricultural intelligence computer system 130 may receive external data 110 from external data server computer 108. External data 110 may be agricultural data related to precipitation including, but not limited to, radar data and rain-gauge data.

External radar data may refer to radar data from an external data server computer 108 such as Next-Generation Radar (NEXRAD), although other embodiments may use other data sources. NEXRAD is a network of high-resolution Doppler weather radars operated by the National Weather Service of the United States. NEXRAD detects precipitation and atmospheric movement. NEXRAD observations may be in the form of radar reflectivity. Radar reflectivity measures intensity of precipitation by emitting pulses of energy into the atmosphere and then measuring the amount of energy that is scattered back to the radar dish. Radar reflectivity from NEXRAD and other radar data sources may be processed from radar reflectivity to rainfall accumulation values. Converting radar reflectivity to rainfall accumulation values may be performed using publicly available algorithms such as the Warning Decision Support System—Integrated Information (WDSS—II) suite. In an embodiment, the external data 110 received is in the form of radar data that has been processed and represents rainfall accumulation records for specific geo-locations.

In an embodiment, external data 110 may include rainfall measurements derived from rain gauge observations. For example, external data server computer 108 may represent a publicly available rain gauge collection system such as the Meteorological Assimilation Data Ingest System (MADIS). Embodiments of the external data server computer 108 may include other public or private repositories of rain gauge observations.

At step 710 the agricultural data records are aggregated into one or more agricultural data sets. An agricultural data set may represent observed agricultural data records originating from a single type of external data 110 for specific geo-locations. For example, the rainfall calculation instructions 171 provide instruction to the agricultural intelligence computer system 130 to aggregate agricultural data records for specific geo-locations into one or more agricultural data sets, where each agricultural data set represents a specific type of external data 110.

In an embodiment, an agricultural data set may be formatted as an n-dimensional vector representing rainfall measurements derived from rain-gauge data. Data within the n-dimensional vector may include rainfall measurements from specific geo-locations at different times. For example, n-dimensional vector "z" contains rain-gauge rainfall measurements from geo-locations $\{s_1, \ldots, s_n\}$ such that, $z=(z(s_1), \ldots, z(s_n))^T$.

In an embodiment, an agricultural data set may be formatted as an n-dimensional vector representing radar-derived rainfall measurements, where n-dimensional vector, "w" is made up of geo-locations $\{s_1, \ldots, s_n\}$ as $w=(w(s_1), \ldots, w(s_n))^T$. The radar-derived rainfall measurements represent an average value, $\tilde{w}(s_i)$, for a given pixel based upon the average value of the pixel and it's surrounding neighbors. For instance, for given geo-location $s_i$, the radar-derived rainfall estimate is:

$$\tilde{w}(s_i) = \frac{1}{|N_i|} \sum_{j \in N_i} w(s_j)$$

Where $N_1$ is the set of all pixels in a neighborhood of $s_i$. A neighborhood may include a 5×5 grid centered around pixel $s_i$. Other embodiments of a neighborhood may be configured to include differently sized grids.

3.2. Transforming Data Records

At step 715 the one or more agricultural data sets are transformed into one or more distributions sets. A distribution set may represent a normalized distribution of an agricultural data set. In an embodiment, the rainfall calculation instructions provide instruction to the agricultural intelligence computer system 130 to transform the one or more agricultural data sets into one or more normalized distribution sets.

In an embodiment, the transformation may be implemented using one parameter Box-Cox transformation. One-parameter Box-Cox transformation is a method to transform data values within a set of data into a normal distribution set using exponent value, λ. The λ indicates the power to which the each data value within the set of data is raised. In an embodiment, λ may be set as λ=0.3. Other embodiments may use different values for λ including, but not limited to, a value between −5.0 and 5.0. In the scenario where λ=0, the transformation would then implement a logarithm function, such that each value of z is transformed as, $y(s_i)=\log(z(s_i))$.

In an embodiment, one parameter Box-Cox transformation may be applied to the rain-gauge n-dimensional vector z, where each value of z is transformed using the following:

$$y(s_i) = \frac{z(s_i)^{-\lambda} - 1}{\lambda}$$

where $y(s_i)$ equals the transformed value for $z(s_i)$ and where λ, equals 0.3. The transformed values are then compiled to make up a distribution set for vector z.

In an embodiment, one parameter Box-Cox transformation may be applied to the radar data n-dimensional vector w, where each value of w̃ is transformed using the following:

$$x(s_i) = \frac{\tilde{w}(s_i)^{\lambda} - 1}{\lambda}$$

where $x(s_i)$ equals the transformed value for $w(s_i)$ and λ, equals 0.3. The transformed values are then compiled to make up a distribution set for vector w.

In an embodiment, distribution sets for vectors z and w are stored in digital memory of the agricultural intelligence computer system 130. For example, the distribution sets are stored within the model and field data repository 160. In an alternative embodiment, the distribution sets may be stored within digital storage that is external from the agricultural intelligence computer system 130.

3.3. Generating Covariate Matrix

Figure 9A:
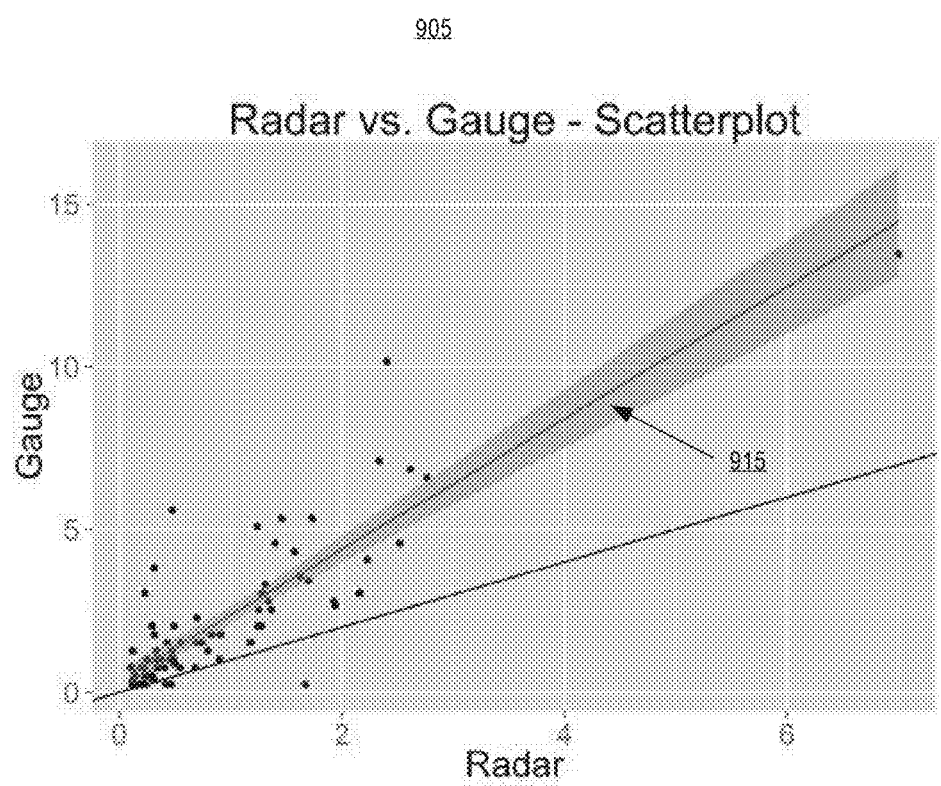

In order to estimate rainfall values for new geo-locations where rainfall data may only exist in the form of radar-derived rainfall data, a correlation between observed rain-gauge data and radar-derived rainfall data must be determined using areas where both types of rainfall data exist. For example, FIG. 9A depicts scatterplot graph plotting observed rain-gauge data versus observed radar-derived rainfall data. Graph 905 plots rain-gauge observations versus radar-derived observations for a one-hour period. The y-axis represents rain-gauge measurements and the x-axis represents radar-derived measurements for specific geo-locations over the one-hour period. Trend line 915 attempts to model a linear relationship between the rain-gauge and radar-derived rainfall measurements; however, the observed data is not distributed enough to generate a predictable relationship.

Referring to FIG. 9B, graph 910 graphs the logarithms of the rain-gauge and radar-derived rainfall measurements, where the y-axis represents the log of the rain-gauge measurements and the x-axis represents the log of the radar-derived measurements for the specific geo-locations over the one hour period. Trend line 920 shows a linear relationship between the log of the rain-gauge data and the log of the radar-derived data. Specifically, the trend line 920 shows that the linear relationship includes an additive bias, where the log values of the rain-gauge data about one value higher than the log values of the radar-derived data for each observed geo-location. Therefore, using this example, the logarithms of rain-gauge data versus the logarithms of radar-derived data show a linear relationship with additive bias.

In an embodiment, a covariate matrix may be generated in order to model the rain-gauge and radar-derived data. At step 720, covariate matrix generation instructions 172, provide instruction to the agricultural intelligence computer system 130 to generate a covariate matrix from the one or more distribution data sets and store the generated covariate matrix in digital memory within the agricultural intelligence computer system 130. For example, a covariate matrix X may be created using values from the distribution sets for vector w, where the covariate matrix X is an n×2 matrix of covariates, such that the first column of the n×2 matrix is a vector of ones and the second column of the n×2 matrix is the radar-derived data for observed geo-locations. The vector of ones within the covariate matrix X exists for matrix algebra purposes such that covariate matrix X is able to be multiplied by 2-dimensional matrix β, described herein.

3.4. Generating Rainfall Regression Model

Regression modeling may be used to predict a correlation between radar-derived data and rain-gauge data. The generated covariate matrix X and the distribution set for vector z (transformed rain-gauge data) may be used to create a regression model that models the relationship between radar-derived data and rain-gauge data. In an embodiment, residuals within a regression model may be influenced by residual values that are within a specific spatial proximity to each other. For this reason, kriging with external drift techniques may be used to create a linear regression model that accounts for spatially correlated residuals, where residuals represent the difference between the observed rainfall value (rain-gauge data) and the estimated rainfall value. Kriging is a method of interpolating values of an unobserved location based on available surrounding observed locations. Kriging with external drift is a spatial prediction technique that combines a regression of a dependent variable on auxiliary variables with kriging of the regression residuals.

In an embodiment, the digital rainfall regression model is a kriging with external drift regression model that may be represented as:

$$y = X\beta + \eta + \varepsilon$$

where:

y is the n-dimensional vector that represents the transformed rain-gauge data, z.

X is the stored n×2 covariate matrix, where the first column is a vector of ones and the second column is the radar-derived data.

β is a 2-dimensional vector where the first element represents the additive bias between the logarithm of the rain-gauge data and the logarithm of the radar-derived data, and the second element represents the multiplicative bias between the logarithm of the rain-gauge data and the logarithm of the radar-derived data.

η is an n-dimensional vector of spatially-varying random error with multi-variate normal distribution.

ε is an error term calculated using a normal distribution, $\varepsilon \sim N(0_n, \sigma^2 I_n)$ where subscript n refers to the row size of the covariate matrix X, $I_n$ is an identity matrix, and $\sigma^2$ represents the nugget effect variance that accounts for measurement error and small-scale spatial variation.

In an embodiment, n-dimensional vector η may be represented as a distribution:

$$\eta \sim N(0_n, \tau^2 R_\rho)$$

where:

$\tau^2$ is the partial sill parameter, and $\rho$ is the spatial range parameter where:

$$[R_\rho]_{ij} = \exp\{-||s_i - s_j||/\rho\}$$

where $R_\rho$ is an n×n matrix, and $[R_\rho]_{ij}$ represents the element in the ith column and jth row. $R_\rho$ is used to model correlations between nearby observations such that the closer $s_i$ and $s_j$ are to each other the larger effect $R_\rho$ has on n-dimensional vector $\eta$. The further apart $s_i$ and $s_j$ are to each other, the closer $R_\rho$ approaches zero and does not have any effect on n-dimensional vector $\eta$.

In an embodiment, the digital rainfall regression model may be rewritten as:

$$y \sim N(X\beta, \Sigma(\theta))$$

where $\theta = (\tau^2, \sigma^2, \rho)$ and $\Sigma(\theta) = \sigma^2 I_n + \tau^2 R_\rho$.

At step 725 regression parameters are estimated for the digital rainfall regression model using the covariate matrix. In an embodiment, the parameter estimation regression instructions provide instruction to the agricultural intelligence computer system 130 to estimate regression parameters for the digital rainfall regression model using restricted maximum likelihood estimation techniques. Restricted maximum likelihood is a technique by which estimating parameters is accomplished by replacing an observed set of data with a set of contrast matrices calculated from the observed set of data. The likelihood function is then calculated from the probability distribution of the contrast matrices.

In an embodiment, the multiple parameters of the digital rainfall regression model may be estimated using restricted maximum likelihood, where the 2-dimensional vector $\beta$ is initially estimated assuming that the digital rainfall regression model is a simple linear regression with independent errors. After initially estimating the 2-dimensional vector $\beta$, coefficient $\theta$ may be estimated by estimating the likelihood of linearly independent contrasts.

Figure 8:
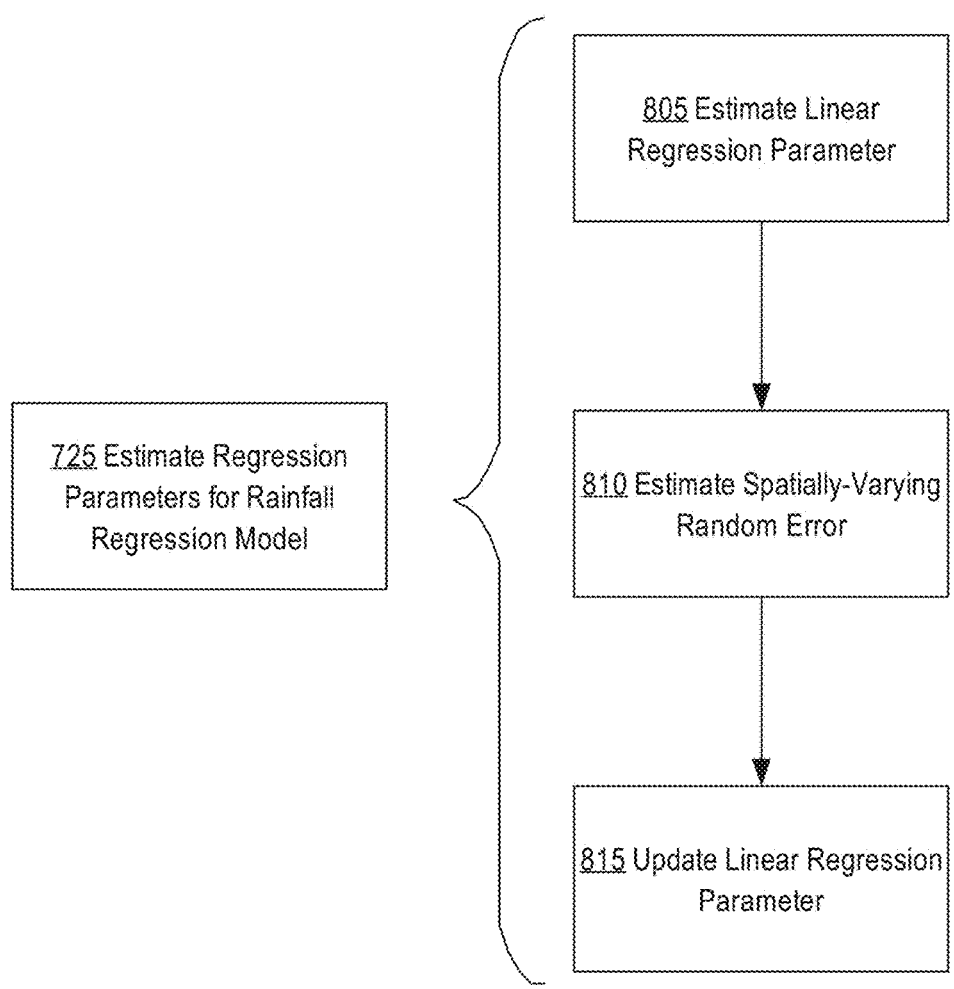
FIG. 8 depicts a detailed example of estimating regression parameters and spatially varying random error values for the rainfall regression model.

FIG. 8 depicts a detailed example of estimating regression parameters and spatially varying random error values for the digital rainfall regression model using restricted maximum likelihood. At step 805, the linear regression parameters in $\beta$ are estimated by assuming that the residuals are independent errors. In an embodiment, the digital rainfall regression model is assumed to have independent errors by treating residuals "$\eta + \varepsilon$" as a single residual value u, such that the assumed linear regression model may be represented as:

$$y = X\beta + u$$

where u represents "$\eta + \varepsilon$".

After estimating the linear regression parameters in $\beta$, parameter $\theta$ may be estimated using the estimated the linear regression parameters in $\beta$. At step 810, parameter $\theta$ is estimated using restricted maximum likelihood and derived linearly independent contrasts from estimated linear regression parameter $\beta$. In an embodiment, $\theta$ may be estimated by deriving u using linearly independent contrasts based upon the linear regression parameter $\beta$, such that:

$$u = (I_n - X(X^T X)^{-1} X^T) y$$

where the distribution of u does not depend on $\beta$. In an embodiment, since X is a n×2 covariate matrix, the linearly independent contrasts, with restricted degrees of freedom result in a singular multivariate distribution for u.

In an embodiment, parameter $\theta$ is estimated using the maximum likelihood function using the distribution for u such that:

$$l(\theta; u) = -\frac{n-p}{2}\log(2\pi) - \frac{1}{2}\log\det\{\Sigma\} - \frac{1}{2}\log\det\{M\} - \frac{1}{2}u^T\left\{\Sigma^{-1} - \Sigma^{-1} X M^{-1} X^T \Sigma^{-1}\right\}u$$

where $l(\theta; u)$ is the function for determining the maximum likelihood for parameter $\theta$, $M = X^T \Sigma^{-1} X$, and $\Sigma^{-1}$ represents $\Sigma(\theta)^{-1}$.

At step 815, the estimated maximum likelihood of parameter $\theta$ is then used to update the estimated value for the linear regression parameters in $\beta$. Since $\beta$ was initially estimated under the assumption that the residuals were independent of each other, $\beta$ must be re-estimated to account for the spatially varying random error values using the estimated parameter $\theta$. In an embodiment, the projected linear regression parameter $\hat{\beta}$ may be estimated based upon the maximized likelihood of parameter $\theta$ as:

$$\hat{\beta} = (X^T \hat{\Sigma}^{-1} X)^{-1} X^T \hat{\Sigma}^{-1} y$$

where $\hat{\Sigma} = \hat{\sigma}^2 I_n + \hat{\tau}^2 R_{\hat{\rho}}$.

In an embodiment, the digital rainfall regression model may be stored in the model and field data repository 160. The regression parameters estimated for the digital rainfall model for the given geo-locations may be used to estimate rainfall-adjusted values for future rainfall measurements associated with the given geo-locations.

3.5. Estimating Rainfall Values for New Locations

Figure 10:
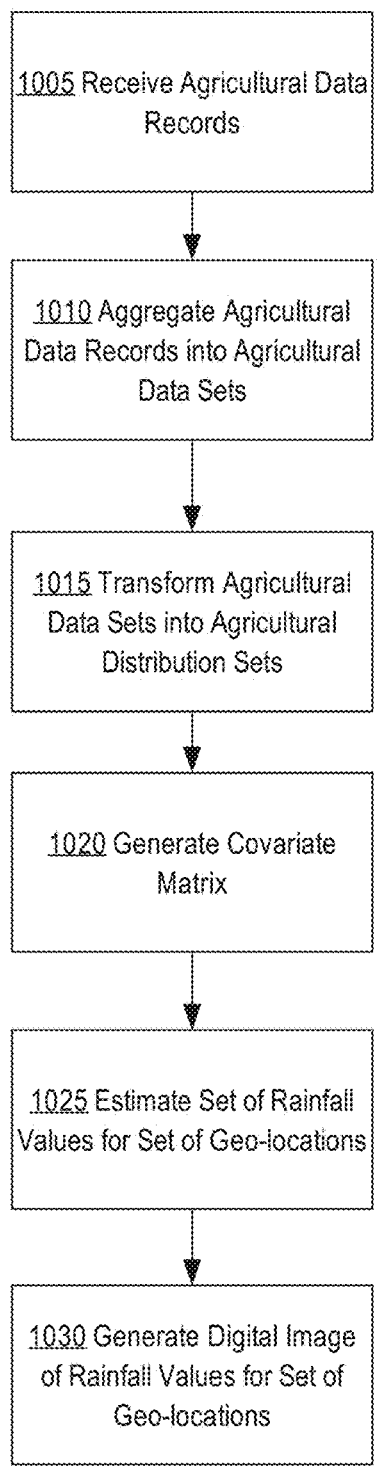
FIG. 10 depicts a detailed example of estimating rain-gauge corrected rainfall values for a set of geo-locations using the digital rainfall regression model.

In an embodiment, the generated digital rainfall regression model may be used to determine rainfall adjustment values for new geo-locations not yet accounted for in the digital rainfall regression model using a probability distribution. FIG. 10 depicts a detailed example of estimating rain-gauge corrected rainfall values for a set of geo-locations using the digital rainfall regression model. Steps 1005, 1010, 1015, and 1020 are substantially similar to the steps of FIG. 7 except that they are applied to agricultural data corresponding to a set of new geo-locations.

At step 1005, agricultural data records received correspond to at least a set of geo-locations that are not part of the geo-locations modeled in the stored digital rainfall regression model. At step 1010 the agricultural data records are aggregated into one or more agricultural data sets. In an embodiment, the rainfall calculation instructions 171 provide instruction to the agricultural intelligence computer system 130 to aggregate agricultural data records for a set of geo-locations into one or more agricultural data sets. At step 1015, the one or more agricultural data sets are transformed into one or more distributions sets. In an embodiment, the rainfall calculation instructions provide instruction to the agricultural intelligence computer system 130 to transform the one or more agricultural data sets into one or more normalized distribution sets.

As described in an embodiment of step 715, transformation may be implemented using one parameter Box-Cox transformation. For example, one parameter Box-Cox transformation is used to transform the m-dimensional vector to produce x*, which equals the transformed radar-derived rainfall estimates at the set of geo-locations $\{r_1, \ldots, r_m\}$, represented by the m-dimensional vector r.

At step 1020, the covariate matrix generation instructions 172, provide instruction to the agricultural intelligence computer system 130 to generate a covariate matrix from the one or more distribution data sets and store the generated covariate matrix in digital memory within the agricultural intelligence computer system 130. In an embodiment, covariate matrix X* is created from distribution set x*. Since the set of geo-locations may include at least some geo-locations not previously modeled by the digital rainfall regression model, some values within the y* distribution set may be null. In an embodiment, covariate matrix X* may include null values for the additive bias between the rain-gauge data and the radar-derived data if the specific geo-location does not include any rain-gauge data.

At step 1025, rainfall-adjusted values are estimated for the set of geo-locations received at step 1005. In an embodiment, the rainfall estimation instructions 174 provide instructions to estimate rainfall-adjusted values for the set of geo-locations using the digital rainfall regression model and the transformed distribution sets for the set of geo-locations. A joint distribution may be determined using the "y" distribution set used to create the digital rainfall regression model and the y* distribution set generated from the set of geo-locations. In an embodiment the joint distribution is a multivariate normal distribution with cross-covariances:

$$cov(y^*, y) = \Sigma^*$$

where cov(y*, y) is a function of the relationship between existing locations that make up y and the new locations that make up y*.

The expectations for each y and y* are represented as:

$$E(y) = X\hat{\beta}$$

$$E(y^*) = X^*\hat{\beta}$$

In order to estimate the adjusted rainfall for the new geo-locations based upon conditions from the existing geo-locations, for which rain-gauge data exists, the conditional expectation is a deterministic function of θ. Therefore the mean predictions of rainfall-adjusted values may be modeled as a multivariate normal distribution with conditional expectation:

$$E(y^*|y) = X^*\hat{\beta} + \Sigma^*\Sigma^{-1}(y - X\beta)$$

Additionally, estimations that are specific to new locations include an estimation of uncertainty as a function of the covariances:

$$cov(y^*|y) = \Sigma^{**} + \Sigma^*\Sigma^{-1}\Sigma^{*T}$$

where:

$\Sigma^{**}$ is the covariance function between new locations y*, as cov(y*, y*)=$\Sigma^{**}$ $\Sigma^{*T}$ is the transpose of $\Sigma^*$.

In an embodiment, estimated rainfall-adjusted values may be stored in the model and field data repository for future estimation purposes and/or for presentation purposes to the user.

3.6. Presenting Rainfall Values

In an embodiment, estimated rainfall-adjusted values may be presented to the user in either a numeric form, a graphical representation, or graphically overlaid onto a graphical image of the geo-locations of interest. At step 1030, the rainfall overlay instructions 175 provide instruction to overlay the rainfall-adjusted values onto a graphical image map of the geo-locations of interest. For example, the set of geo-locations may be represented using a digital image map. The rainfall-adjusted values may then be overlaid onto the digital image map, where different rainfall values may be represented using different shades of colors. Shades of colors may include, but are not limited to: a dark green shade may represent rainfall between 0-5 mm per hour, a light yellow-green shade may represent rainfall between 5-10 mm per hour, a yellowish orange shade may represent rainfall between 10-15 mm per hour, a orange-to-pink shade may represent rainfall between 15-20 mm per hour, and a light pink-to-white shade may represent rainfall values greater than 20 mm per hour. Other embodiments may implement different colors or different levels of shading to differentiate the different rainfall values.

Figure 11A:
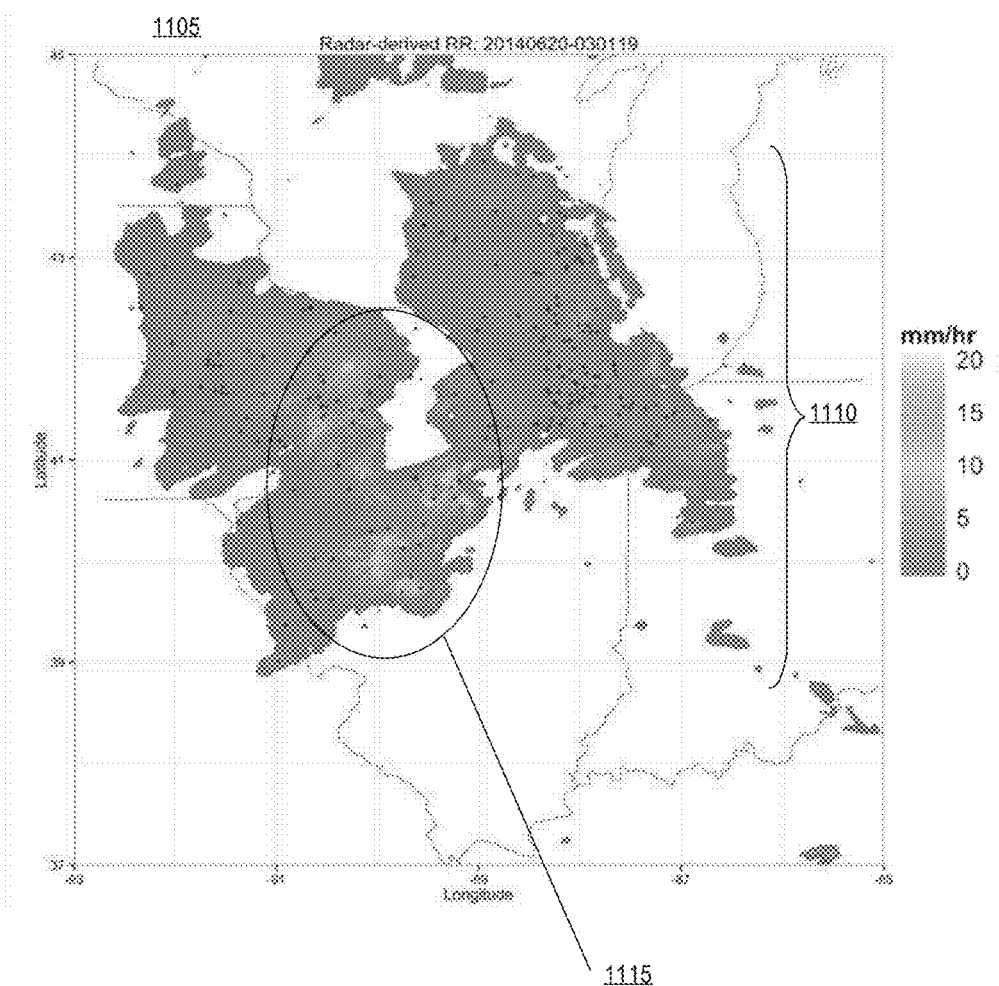
FIG. 11A and FIG. 11B each depict a digital image of rainfall estimations for a specific geographic area.
Figure 11B:
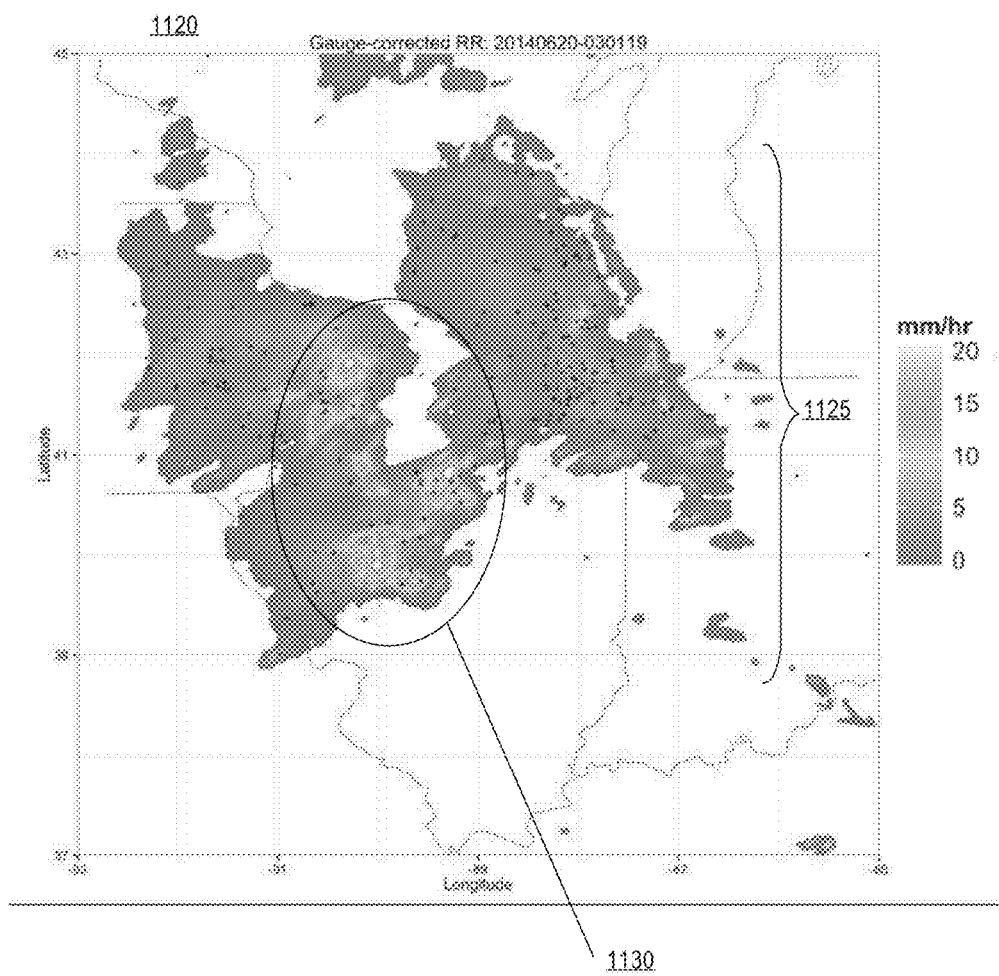

In an embodiment, the rainfall overlay instructions 175 may provide instruction to produce multiple overlay images of the geo-locations of interest where one overlay image provides rainfall values based only on radar-derived rainfall data and another overlay image provides rainfall values based on rainfall-adjusted estimations. FIG. 11A and FIG. 11B depict example digital images of rainfall estimations for specific geo-locations.

In an embodiment, graph 1105 in FIG. 11A depicts a set of geo-locations that make up a geographic area. Specifically, graph 1105 represents the set of geo-locations, in graphical form, as a map of the set of geo-locations. Shading 1110 represents radar-derived rainfall data that has been overlaid onto the graph 1105. The shading 1110 shows where, on graph 1105, rainfall was observed and the amount of rainfall based upon the radar-derived observations. In an embodiment, the different amounts of rainfall are shown using different colors and levels of shading. Geo-location 1115 shows that based upon the lighter shading of radar-derived rainfall data there were areas where observed rainfall was close to 10 mm/hr.

Referring to FIG. 11B, graph 1120 depicts a map of the same set of geo-locations, in graphical form, as graph 1105. Shading 1125 represents rainfall-adjusted values as estimated using by the agricultural intelligence computer system 130. Geo-location 1130 represents the same location as geo-location 1115. However, shading at geo-location 1130 shows larger rainfall amounts based upon rainfall-adjusted values than the radar-derived values in graph 1105. Therefore the differences in calculated rainfall amounts between radar-derived rainfall and rainfall-adjusted values may provide a user of the agricultural intelligence computer system 130 with more accurate rainfall reporting than relying on a single agricultural data source.

In an embodiment, the graphic representations such as graph 1105 and graph 1120 may be presented to the user by the presentation layer 134 sending, via the network, the graphical representations of rainfall amounts to the field manager computer device 104. In another embodiment, graph 1105 and graph 1120 may be stored within the model and field data repository 160 for future reference as historical data.

What is claimed is:

1. A computer-implemented method comprising:
   using rainfall calculation instructions in a server computer system, receiving one or more agricultural data records that represent observed agricultural data points for specific geo-locations at a specific time, wherein the observed agricultural data points include observed radar data from a radar source and observed rain-gauge data from one or more rain gauges that comprise a plurality of precipitation data values;
   using the rainfall calculation instructions, aggregating the one or more agricultural data records into one or more agricultural data sets, where each agricultural data set from the one or more agricultural data sets represents a single type of observed agricultural data;
   using the rainfall calculation instructions, transforming the one or more agricultural data sets into one or more agricultural distribution sets, where the one or more agricultural distribution sets represent a normalized distribution of the one or more agricultural data sets;

using covariate matrix generation instructions in the server computer system, generating a covariate matrix from the one or more agricultural distribution sets and storing the covariate matrix in digital memory, by deriving at least some values within the covariate matrix from the one or more agricultural distribution sets;

using the covariate matrix generation instructions, automatically determining values within the covariate matrix as an average difference between the observed rain-gauge data and the observed radar data; and using parameter estimation instructions in the server computer system, automatically estimating regression parameters for a digital rainfall regression model using the covariate matrix as a set of covariate values and using the one or more agricultural distribution sets as rainfall observations.

2. The method of claim 1, further comprising transforming the one or more agricultural data sets into the one or more agricultural distribution sets, by applying a configured lambda exponent value to the one or more agricultural data sets.

3. The method of claim 1, wherein the digital rainfall regression model is a linear regression model comprising variance parameters that are spatially correlated.

4. The method of claim 1, wherein estimating regression parameters for the digital rainfall regression model comprises:
by program instructions, estimating a linear regression parameter based on treating error terms and residuals within the digital rainfall regression model as independent errors;
by the program instructions, estimating spatially-varying random error covariance parameters using a set of contrasts that are based upon the linear regression parameter; and
by the program instructions, updating the linear regression parameter based upon the spatially-varying random error covariance parameters.

5. The method of claim 4, further comprising estimating the spatially-varying random error covariance parameters by deriving the spatially-varying random error covariance parameters by applying restricted maximum likelihood to the linear regression parameter.

6. The method of claim 4, further comprising updating the linear regression parameter by using a maximum likelihood of the spatially-varying random error covariance parameters.

7. A computer-implemented method comprising:
using rainfall calculation instructions in a server computer system, receiving one or more agricultural data records that represent observed agricultural data points for specific geo-locations at a specific time, wherein the observed agricultural data points include observed radar data from a radar source and observed rain-gauge data from one or more rain gauges that comprise a plurality of precipitation data values;
using the rainfall calculation instructions, aggregating the one or more agricultural data records into one or more agricultural data sets, where each agricultural data set from the one or more agricultural data sets represents a single type of observed agricultural data;
using the rainfall calculation instructions, transforming the one or more agricultural data sets into the one or more agricultural distribution sets, where the one or more agricultural distribution sets represent a normalized distribution of the one or more agricultural data sets;
using covariate matrix generation instructions in the server computer system, generating a covariate matrix from the one or more agricultural distribution sets and storing the covariate matrix in digital memory, by deriving at least some values within the covariate matrix from the one or more agricultural distribution sets;
using the covariate matrix generation instructions, determining the at least some values within the covariate matrix as an average difference between the observed rain-gauge data and the observed radar data;
using rainfall estimation instructions in the server computer system, estimating a set of rainfall values for a set of geo-locations that correspond to the at least some values within the covariate matrix using defined regression parameters from a digital rainfall regression model and previously stored rainfall adjustment data sets; and
using rainfall overlay instructions, generating a digital image of the set of rainfall values, where the digital image corresponds to a digital image of the set of geo-locations with the set of rainfall values overlaid onto the digital image of the set of geo-locations.

8. The method of claim 7, further comprising transforming the one or more agricultural data sets into the one or more agricultural distribution sets, by applying a configured lambda exponent value to the one or more agricultural data sets.

9. The method of claim 7, wherein the digital rainfall regression model is a linear regression model comprising variance parameters that are spatially correlated.

10. The method of claim 7, wherein estimating rainfall values for a set of geo-locations comprises generating a joint distribution between the one or more agricultural distribution sets and previously modeled rainfall adjustment data sets.

11. A data processing system comprising:
a memory;
one or more processors coupled to the memory;
rainfall calculation instructions stored in memory, executed by the one or more processors, and configured to cause the one or more processors to receive one or more agricultural data records that represent observed agricultural data points for specific geo-locations at a specific time, wherein the observed agricultural data points include observed radar data from a radar source and observed rain-gauge data from one or more rain gauges that comprise a plurality of precipitation data values;
the rainfall calculation instructions stored in memory, executed by the one or more processors, and configured to cause the one or more processors to aggregate the one or more agricultural data records into one or more agricultural data sets, where each agricultural data set from the one or more agricultural data sets represents a single type of observed agricultural data;
the rainfall calculation instructions stored in memory, executed by the one or more processors, and configured to cause the one or more processors to transform the one or more agricultural data sets into one or more agricultural distribution sets, where the one or more agricultural distribution sets represent a normalized distribution of the one or more agricultural data sets;
covariate matrix generation instructions stored in memory, executed by the one or more processors, and configured to cause the one or more processors to generate a covariate matrix from the one or more agricultural distribution sets and storing the covariate matrix in digital memory, by deriving at least some values within the covariate matrix from the one or more agricultural distribution sets and to cause the one or more processors to determine values within the covariate matrix as an average difference between the observed rain-gauge data and the observed radar data for the specific geo-locations; and parameter estimation instructions stored in memory, executed by the one or more processors, and configured to cause the one or more processors to estimate regression parameters for a digital rainfall regression model using the covariate matrix as a set of covariate values and using the one or more agricultural distribution sets as rainfall observations.

12. The data processing system of claim 11, further comprising instructions stored in memory, executed by the one or more processors, and configured to cause transforming the one or more agricultural data sets into the one or more agricultural distribution sets, by applying a configured lambda exponent value to the one or more agricultural data sets.

13. The data processing system of claim 11, wherein the digital rainfall regression model is a linear regression model comprising variance parameters that are spatially correlated.

14. The data processing system of claim 11, wherein the parameter estimation instructions further comprises program instructions, stored in memory, executed by the one or more processors, and configured to cause:
estimating a linear regression parameter based on treating error terms and residuals within the digital rainfall regression model as independent errors;
estimating spatially-varying random error covariance parameters using a set of contrasts that are based upon the linear regression parameter; and
updating the linear regression parameter based upon the spatially-varying random error covariance parameters.

15. The data processing system of claim 14, further comprising instructions stored in memory, executed by the one or more processors, and configured to cause estimating the spatially-varying random error covariance parameters by deriving the spatially-varying random error covariance parameters by applying restricted maximum likelihood to the linear regression parameter.

16. The data processing system of claim 14, further comprising instructions stored in memory, executed by the one or more processors, and configured to cause updating the linear regression parameter by using a maximum likelihood of the spatially-varying random error covariance parameters.

17. A data processing system comprising:
a memory;
one or more processors coupled to the memory;
rainfall calculation instructions stored in memory, executed by the one or more processors, and configured to cause the one or more processors to receive one or more agricultural data records that represent observed agricultural data points for specific geo-locations at a specific time, wherein the observed agricultural data points include observed radar data from a radar source and observed rain-gauge data from one or more rain gauges that comprise a plurality of precipitation data values;

the rainfall calculation instructions stored in memory, executed by the one or more processors, and configured to cause the one or more processors to aggregate the one or more agricultural data records into one or more agricultural data sets, where each agricultural data set from the one or more agricultural data sets represents a single type of observed agricultural data;

the rainfall calculation instructions stored in memory, executed by the one or more processors, and configured to cause the one or more processors to transform the one or more agricultural data sets into one or more agricultural distribution sets, where the one or more agricultural distribution sets represent a normalized distribution of the one or more agricultural data sets;

covariate matrix generation instructions stored in memory, executed by the one or more processors, and configured to cause the one or more processors to generate a covariate matrix from the one or more agricultural distribution sets and storing the covariate matrix in digital memory, by deriving at least some values within the covariate matrix from the one or more agricultural distribution sets and configured to cause the one or more processors to determine the at least some values within the covariate matrix as an average difference between the observed rain-gauge data and the observed radar data for specific geo-locations;

rainfall estimation instructions stored in memory, executed by the one or more processors, and configured to cause the one or more processors to estimate a set of rainfall values for a set of geo-locations that correspond to the at least some values within the covariate matrix using defined regression parameters from a digital rainfall regression model and previously stored rainfall adjustment data sets; and rainfall overlay instructions stored in memory, executed by the one or more processors, and configured to cause the one or more processors to generate a digital image of the set of rainfall values, where the digital image corresponds to a digital image of the set of geo-locations with the set of rainfall values overlaid onto the digital image of the set of geo-locations.

18. The data processing system of claim 17, further comprising instructions stored in memory, executed by the one or more processors, and configured to cause transforming the one or more agricultural data sets into the one or more agricultural distribution sets, by applying a configured lambda exponent value to the one or more agricultural data sets.

19. The data processing system of claim 17, wherein the digital rainfall regression model is a linear regression model comprising variance parameters that are spatially correlated.

20. The data processing system of claim 17, further comprising instructions stored in memory, executed by the one or more processors, and configured to cause generate a joint distribution between the one or more agricultural distribution sets and previously modeled rainfall adjustment data sets.

* * * * *